United States Patent
Lin et al.

(10) Patent No.: US 6,424,522 B1
(45) Date of Patent: Jul. 23, 2002

(54) STRUCTURE AND CIRCUIT OF INPUT/OUTPUT PORT BAR TO CONNECT COMPUTER PERIPHERAL

(75) Inventors: Ruey-I Lin, Nantou Hsien; De-He Huang, Kaohsiung Hsien, both of (TW)

(73) Assignee: Twinhead International Corp., Hsinchu (TW)

( * ) Notice: Subject to any disclaimer, the term of this patent is extended or adjusted under 35 U.S.C. 154(b) by 116 days.

(21) Appl. No.: 09/685,425

(22) Filed: Oct. 10, 2000

(51) Int. Cl.[7] .................................................. H05K 5/02
(52) U.S. Cl. ...................... 361/683; 361/686; 361/748; 439/629; 439/638; 439/946; 439/947; 312/223.1; 312/223.2
(58) Field of Search ................................. 361/683, 686, 361/748, 728, 736, 737; 439/59, 60, 62, 629, 638, 946, 947; 312/223.1, 223.2

(56) References Cited

U.S. PATENT DOCUMENTS

| | | | | |
|---|---|---|---|---|
| 5,321,580 A | * | 6/1994 | Hosoi et al. ................. | 361/684 |
| 5,661,633 A | * | 8/1997 | Patret ........................... | 361/683 |
| 5,748,443 A | * | 5/1998 | Flint et al. ................... | 361/686 |
| 6,098,127 A | * | 8/2000 | Kwang .......................... | 710/62 |
| 6,147,859 A1 | * | 4/2001 | Abboud ......................... | 361/683 |
| 6,215,656 B1 | * | 4/2001 | O'Neal et al. ............... | 361/683 |
| 6,284,978 B1 | * | 9/2001 | Pavillard et al. ............... | 174/97 |
| 6,304,436 B1 | * | 10/2001 | Branch et al. ............... | 361/683 |

* cited by examiner

*Primary Examiner*—Darren Schuberg
*Assistant Examiner*—David Foster
(74) *Attorney, Agent, or Firm*—J.C. Patents

(57) ABSTRACT

A structure and a circuit of an input/output (I/O) port bar to connect between a computer and a computer peripheral. The structure of the I/O port bar has a laminate, a loop and a sliding member (with a pushing portion, a first protrusion portion and a second protrusion portion). Thus constructed, the connecting cable can be restored to the inside of the I/O port bar. In the circuit of the I/O port bar, a power switching circuit is formed to control whether the power of the main circuit is supplied by an external computer via the connecting cable or directly by an external DC power source.

12 Claims, 6 Drawing Sheets

STRUCTURE AND CIRCUIT OF INPUT/OUTPUT PORT BAR TO CONNECT COMPUTER PERIPHERAL

BACKGROUND OF THE INVENTION

1. Field of the Invention

The invention relates in general to an input/output port bar. More particularly, this invention relates to the structure and circuit of an I/O port bar for connecting a computer peripheral. The structure of the I/O port bar allows the connecting cable to be restored to the inside the I/O port bar, while the circuit of the I/O port bar has a power switch circuit used as an automatic power switch. This invention also relates to a computer system with the input/output port bar.

2. Description of the Related Art

It is well known that the input/output (I/O) port bar is used as a bridge between a computer (for example, a personal notebook computer) and an external computer peripheral (for example, a mouse, a keyboard, a monitor or a printer). That is, the I/O port bar transfers the signal received from the universal serial bus (USB) of the computer into a signal that the computer peripheral can accept and recognize. Alternatively, the I/O port bar transfers the signal received from the computer peripheral into a USB signal that the computer accepts. In addition to an I/O port bar circuit, the I/O port bar structure further comprises a connecting cable to connect between the I/O port bar circuit and computer. Since the connecting cable is external to the I/O port bar, it occupies additional storage space. It is also possible for the connecting cable to be broken inadvertently by the user.

The I/O port bar normally connects to the power source from the computer via the connecting cable. However, the I/O port bar can also be connected to a DC power source directly. The conventional I/O port bar uses a relay as the switch between the power source of the computer and the external DC power source. Since the relay is used as the power switch, it has to be activated manually to achieve the power switch function. This is very inconvenient for users.

SUMMARY OF THE INVENTION

The invention provides an I/O port bar structure with the function of restoring the connecting cable inside of the I/O port bar. Thus, storage space can be saved, and there is no need to worry about breaking the connecting cable inadvertently.

The I/O port bar structure used to connect a computer and a computer peripheral comprises a main circuit board, a connecting board, a first enclosure, a second enclosure, I/O ports, a laminate, a loop and a sliding member.

The connecting cable has a first terminal and a second terminal in the opposite ends. The first terminal is coupled to a computer, and the second terminal is coupled to the main circuit board. The first and second enclosures contain the main circuit board and the connecting cable. The I/O ports and the main circuit board are electrically coupled to a computer peripheral. The loop can be moved between the laminate and the first enclosure. The connecting cable skirts the periphery of the loop between the laminate and the second enclosure, so that the first and second terminals are located at the same sides. One side of the sliding member comprises a first protrusion and a second protrusion, and the other side of the sliding member comprises a pushing portion. The first protrusion portion is engaged within the loop, and the pushing portion is engaged with the first and second protrusion via a strip gap on the first enclosure. The sliding member can slide along the strip gap. When the pushing portion is pushed, the sliding member moves towards the first terminal of the connecting cable. The first terminal is pushed out of the I/O port bar via the second protrusion. By pulling the first terminal, the whole connecting cable can be pulled out of the I/O port bar. In contrast, by pushing the sliding member away from the first terminal, the loop is led to restore the connecting cable to the inside of the I/O port bar.

The invention further provides an I/O port bar circuit. The I/O port bar circuit comprises a power switching circuit used as an automatic power switch.

The I/O port circuit used to connect the computer and the computer peripheral comprises a main circuit, a connecting cable and a power switch circuit. Two terminals of the connecting cable are connected to the computer and the main circuit to transfer a USB signal from the computer into an output signal that the computer peripheral accepts. Or alternatively, main circuit transfers a signal from the computer peripheral into a USB signal that the computer accepts. The power switching circuit is used to control power source of the main circuit supplied by either the computer or an external DC power source.

Both the foregoing general description and the following detailed description are exemplary and explanatory only and are not restrictive of the invention, as claimed.

DESCRIPTION OF THE PREFERRED EMBODIMENTS

Figure 1:
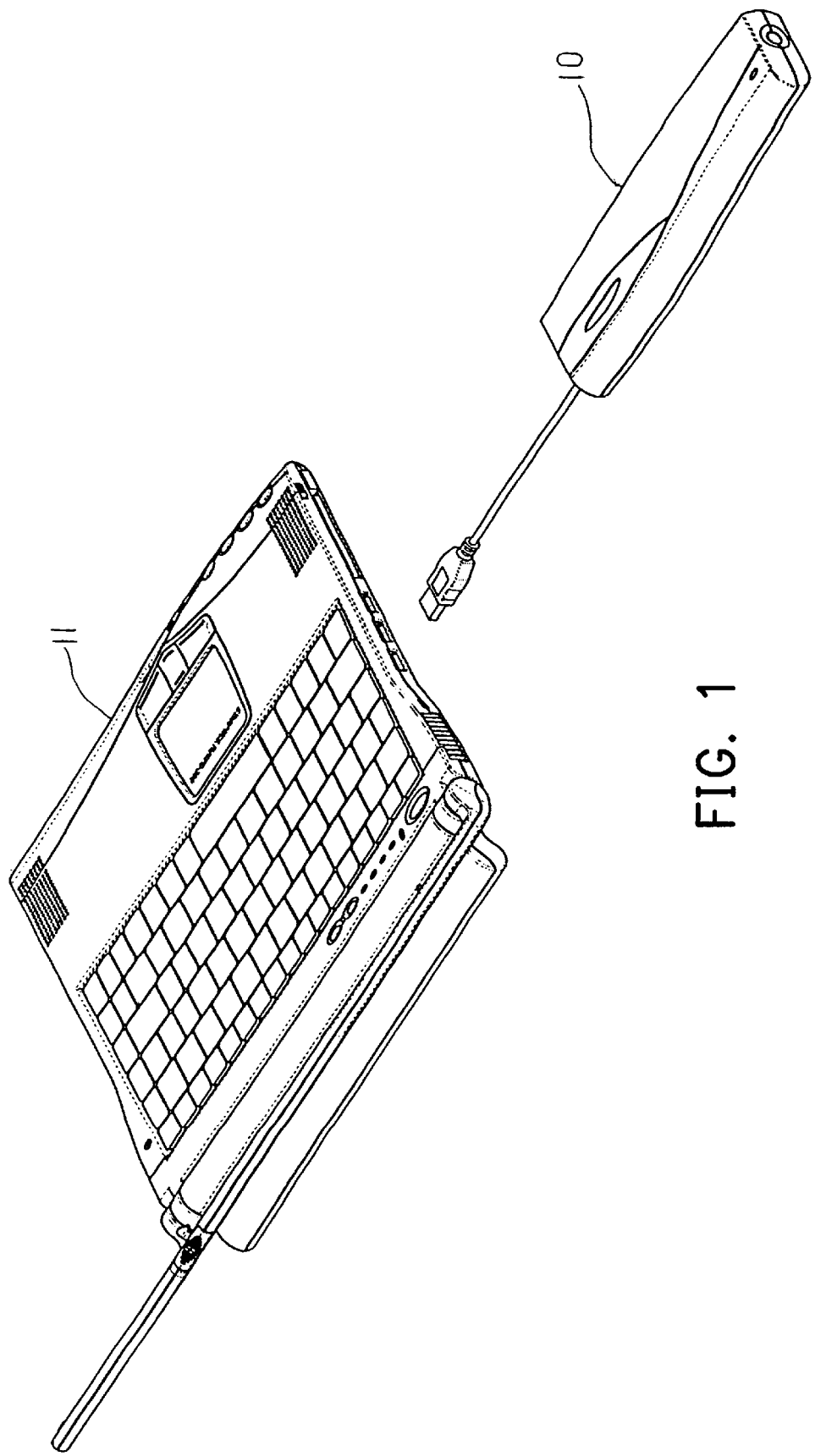
FIG. 1 shows a schematic drawing of an I/O port bar used for connecting a computer to a computer peripheral.
Figure 2:
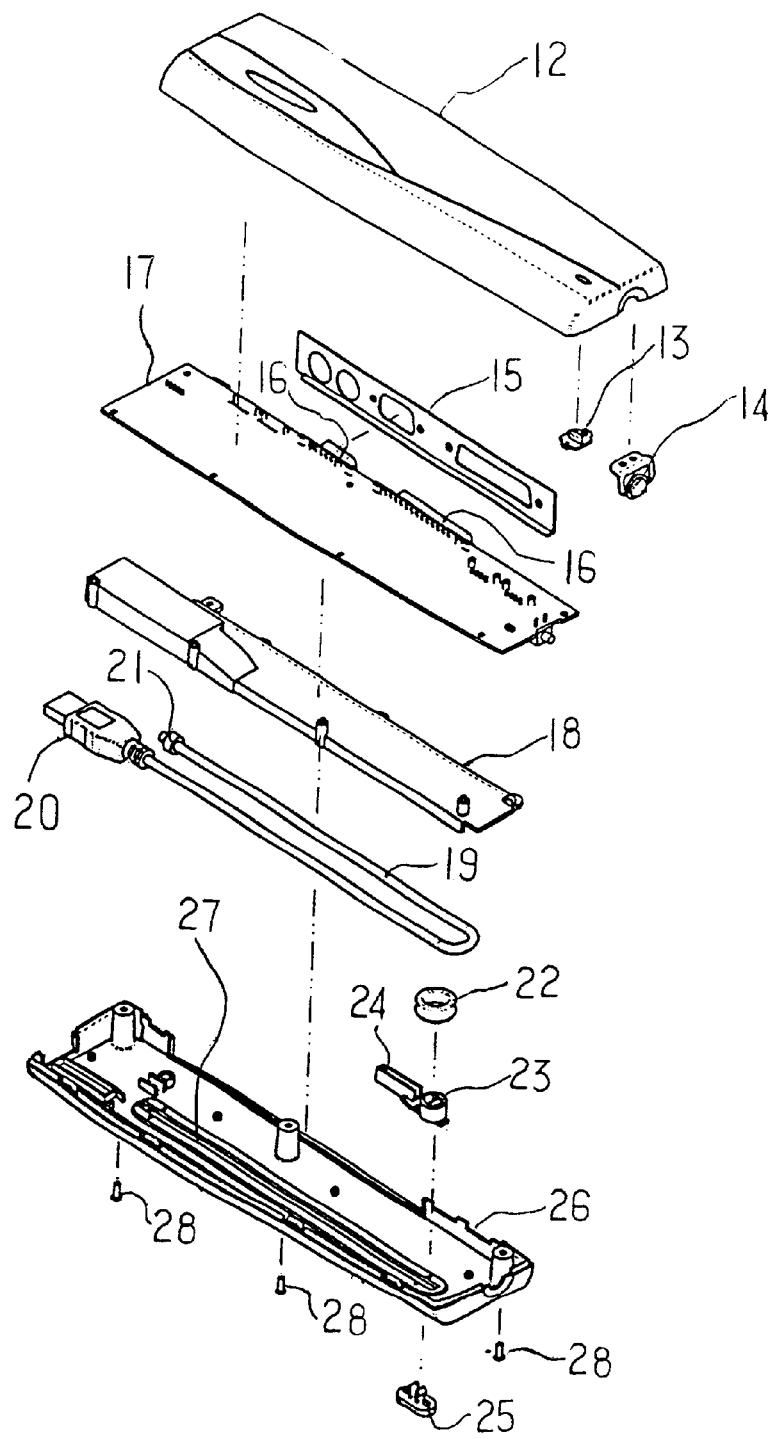
FIG. 2 is an exploded view showing an I/O port bar structure used to connect a computer peripheral.

FIG. 1 shows an embodiment of an input/output (I/O) port bar 10 for connecting a computer and a computer peripheral. A notebook computer 11 is used as an example in this embodiment. FIG. 2 shows an exploded view of the I/O port bar structure.

In FIG. 2, the I/O port 10 comprises a first enclosure 12, a light emitting diode (LED) 13, a reset button 14, a side board 15, multiple input/output (I/O) ports 16, a main circuit board 17, a laminate 18, a connecting cable 19, a loop 22, a sliding member and a second enclosure 26. The sliding member further comprises a pushing portion 25, a first protrusion 23 and a second protrusion 24. The connecting cable comprises a A first terminal and second terminal 20 and 21 on opposite ends. A strip gap 27 is formed on the second enclosure 26, so that the pushing portion 25 is engaged with the first and second protrusions 23 and 24 via the strip gap 27. The first and second protrusions 23 and 24 are monobloc or indented with each other with the first protrusion 23 engaged in the loop 22. The connecting cable 19 skirting the loop 22 is disposed between the laminate 18 and the second enclosure 26. Thus, the first terminal and second terminal 20 and 21 are located at the same side. Along the periphery of the loop 22, a groove or recess is formed. The connecting cable 19 can pass the recess. The first terminal 20 is connected to a computer and the second terminal 21 is connected to an input terminal of the main circuit 17. The I/O ports 16 are connected to the computer peripheral, for example, the mouse, keyboard, monitor and printer. A screw is used to couple the first and second enclosures 12 and 26.

When connecting the connecting cable 19 and the computer, the pushing portion 25 is pushed, and the whole sliding member including the pushing portion 25, the first protrusion 23 and the second protrusion 24 moves toward the first terminal 20.

Figure 3A:
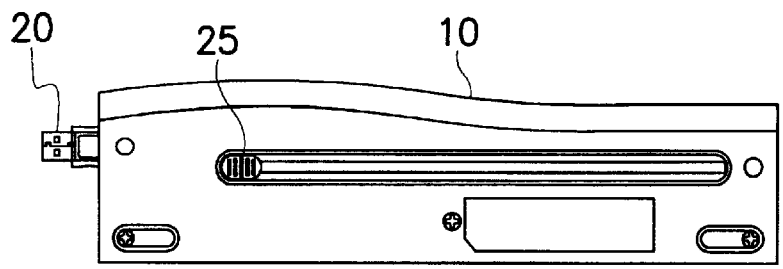
FIGS. 3A–3B are schematic drawings for pulling the connecting cable.
Figure 3B:
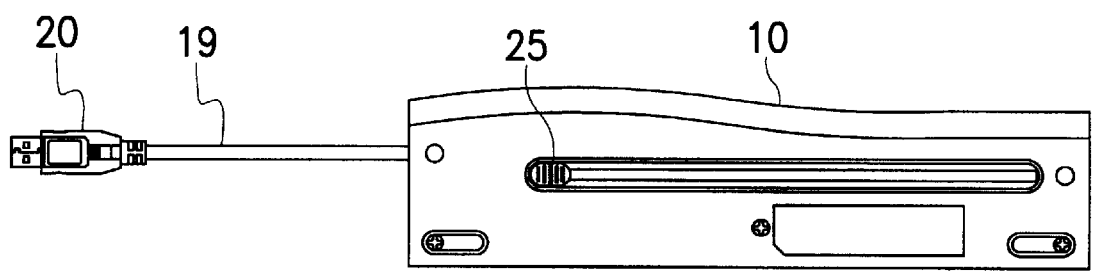

As a result, when the second protrusion 24 is in contact with the first terminal 20, the first terminal 20 is pushed outside of the I/O port bar 10 as shown in FIG. 3A in storage position. By an external force, the first terminal 20 out of the I/O port bar 10 can be pulled out as shown in FIG. 3B in usage position. In contrast, by pushing the pushing portion 25 away from the first terminal 20, the loop 22 is led by the sliding member, and the connecting cable 19 is then restored to the inside of the I/O port bar 10.

Figure 4A:
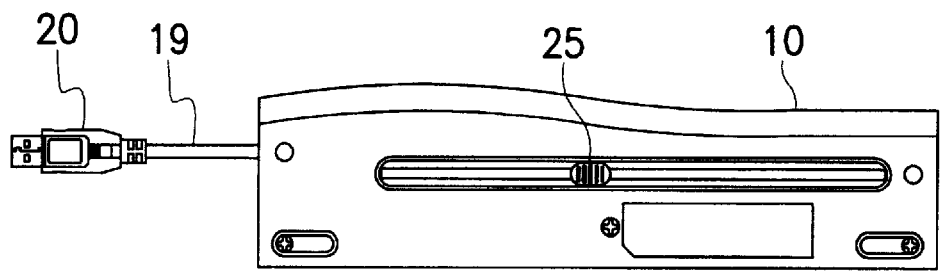
FIGS. 4A–4B are schematic drawings for restoring the connecting cable.
Figure 4B:
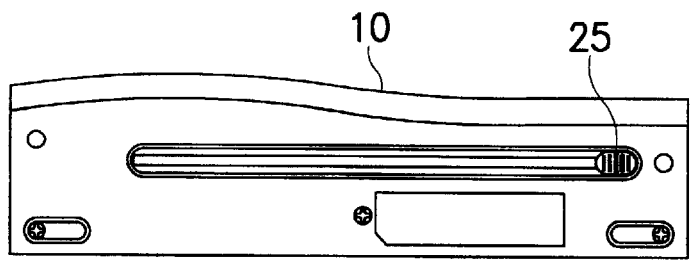

The restoring operation can be referred to FIG. 4A to FIG. 4B.

Figure 5:
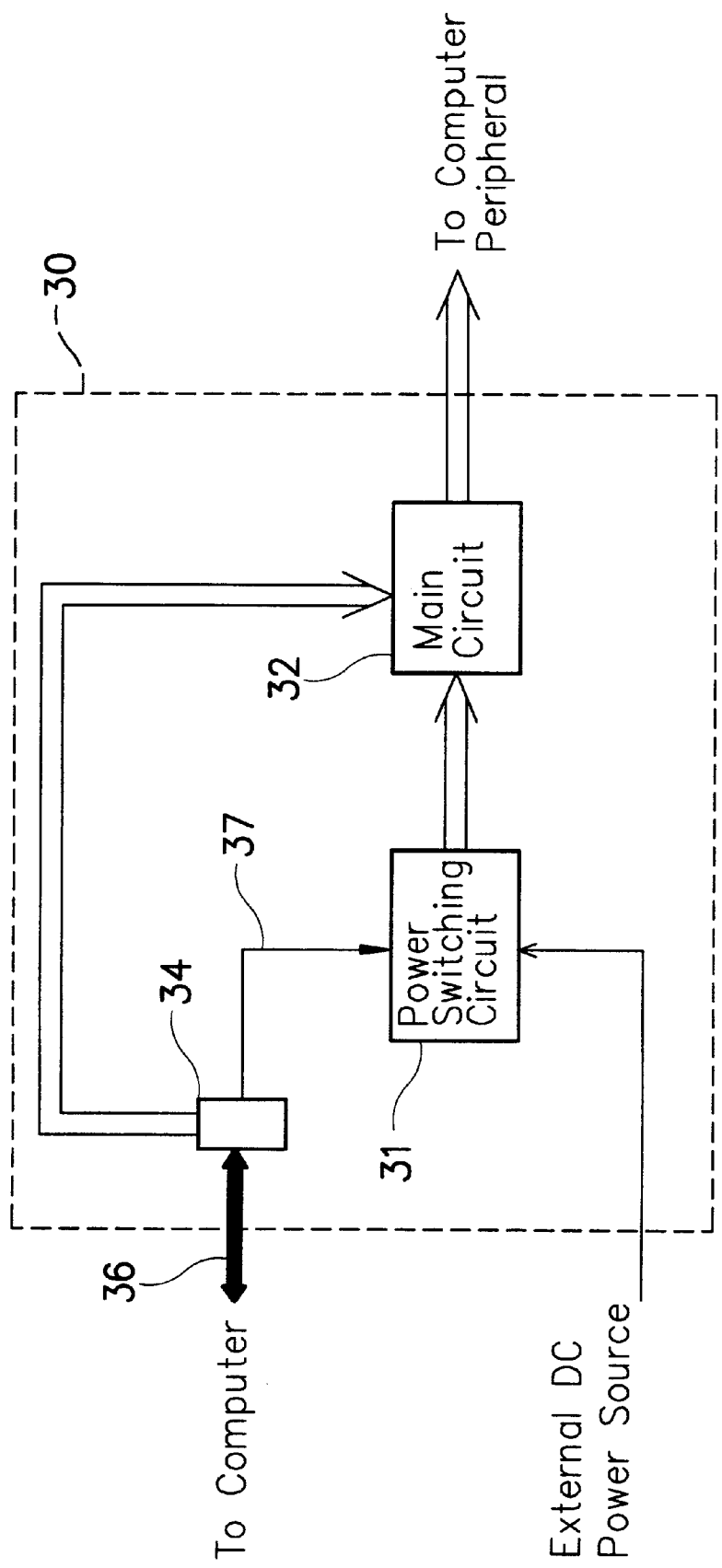
FIG. 5 is a block diagram showing an I/O port bar circuit used to connect a computer to a computer peripheral.
Figure 6:
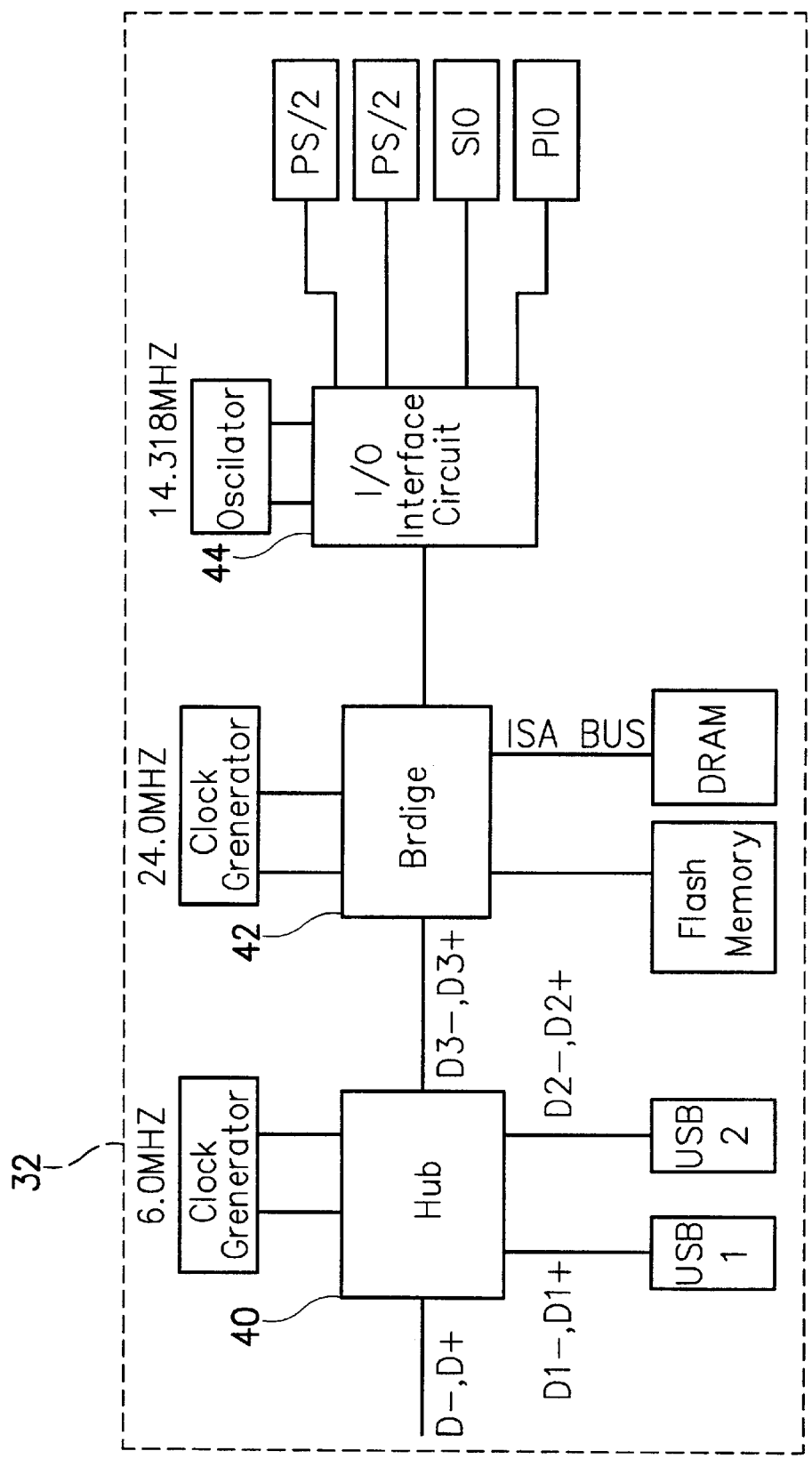
FIG. 6 shows a detailed circuit diagram of the main circuit.

In FIG. 5, a circuit diagram of an I/O port bar circuit 30 is illustrated. The I/O port bar circuit 30 comprises a power switch circuit 31, a main circuit 32, a connector 34 and a connecting cable 36. The connecting cable 36 is connected to an external computer to transmit a USB signal from the computer to the main circuit 32 via the connector 34, or to transmit the signal from the main circuit 32 to the computer. The main circuit 32 is used to transfer USB signal from the connecting cable 36 into a signal that the computer peripheral accepts, or to transfer the signal of the computer peripheral into a USB signal. In FIG. 6, the main circuit 32 basically comprises a USB hub (for example, an ISP1122 chip) 40, a bridge (for example, a SMsC 97C100 chip) 42 and an I/O interface circuit (for example, SMsC FDC 37C672 chip) 42 connected to each in series.

The power switch circuit 31 is used to control the power supply of the main circuit 32. That is, the power switch circuit 31 controls whether the main circuit 32 is supplied by the computer via the connecting cable 36 or directly by an external DC power source.

Figure 7:
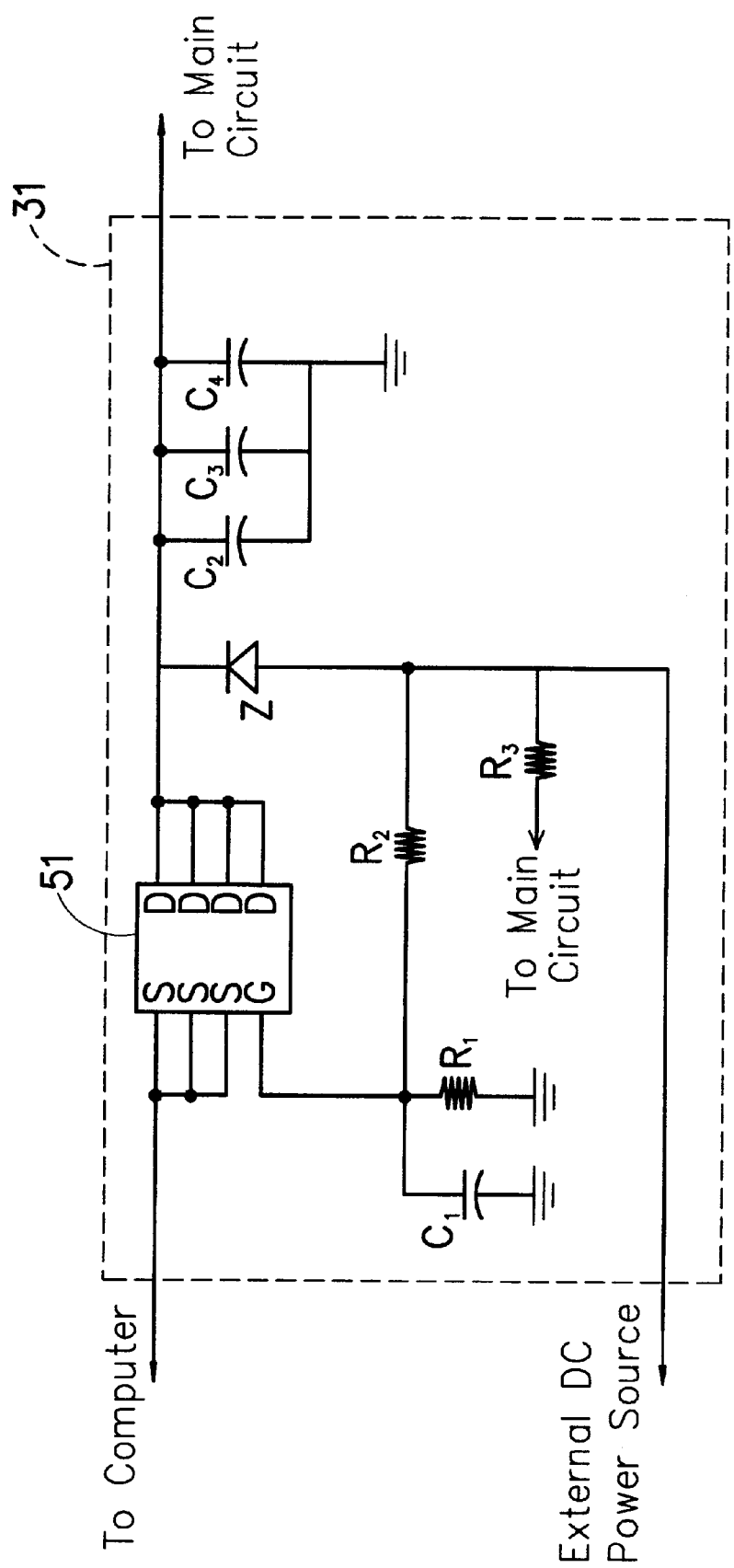
FIG. 7 shows a detailed circuit diagram of the power switching circuit as shown in FIG. 5.

FIG. 7 shows a detailed circuit diagram of the power switch circuit 31 as shown in FIG. 5. As shown in FIG. 7, the power switch circuit 31 comprises a PMOS transistor 51, a first resistor $R_1$, a second resistor $R_2$, a third resistor $R_3$, bypass capacitors $C_1, C_2, C_3, C_4$ and a diode Z. The PMOS transistor 51 is connected to the computer via the connecting cable 36. The first resistor $R_1$ is connected between the gate of the PMOS transistor 51 and ground. The diode Z has a cathode connected to the drain of the PMOS transistor 51, and an anode connected to the external DC power source. The second resistor $R_2$ is connected between the gate of the PMOS transistor 51 and the anode of the diode Z. The third resistor $R_3$ has a first end connected to the anode of the diode Z and a second end connected to the main circuit 32. According to the voltage at the second end of the third resistor $R_3$, the main circuit 32 determines the magnitude of the maximum current that the power source can provides from the computer or from the external DC power source. In addition, the bypass capacitor $C_1$ is connected between the gate of the PMOS transistor 51 and ground. The bypass capacitors $C_2, C_3, C_4$ are connected between the drain of the PMOS transistor 51 and ground to filter noise, so that the operation of the power switch circuit 31 is stabilized. In the invention, the I/O port bar circuit 30 uses a power switch circuit 10 as an automatic power switch. When the power switch circuit 10 detects that an external DC power source is connected to the I/O port bar circuit 10, the power from the computer via the connecting cable 36 is automatically switched off. The main circuit 32 is supplied by the external DC power source only. On the contrary, when the power switch circuit 10 does not detect that the external DC power source is connected to the I/O port bar circuit 10, the main circuit 32 is supplied by the computer via the connecting cable 36 solely. That is, when the external DC power source is disconnected, the PMOS transistor is on, so that the power voltage of the connecting cable is provided to the main circuit. On the contrary, when the external DC power source is connected, the power from the external power source is supplied to the main circuit via the diode. Therefore, compared to the usage of the relay in the conventional circuit, advantages such as an efficient and convenient operation, and an automatic switch function can be obtained in this invention.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An input/output port bar structure used to a computer and a computer peripheral, comprising:
   a main circuit board;
   a connecting cable, having a first terminal and a second terminal coupled to the computer and the main circuit board;
   a first enclosure;
   a second enclosure, coupled to the first enclosure for containing the main circuit board and the connecting cable therein;
   a plurality of input/output ports, electrically connected to the main circuit board and connected to the computer peripheral;
   a laminate, positioned between the first and second enclosures for receiving the connecting cable;
   a loop, removably movable between the laminate and the first enclosure; and
   a sliding member, for the sliding member sliding along a strip gap between a storage position and a usage position.

2. The structure according to claim 1, wherein the sliding member further comprises a first and a second protrusion at one end and a pushing portion at the other end.

3. The structure according to claim 2, wherein when at the usage position the pushing position is engaged with the first and the second protrusions via a strip gap formed on the first enclosure, the connecting cable extends from the structure.

4. The structure according to claim 1, wherein the first and second protrusions are monobloc.

5. The structure according to claim 1, wherein the loop further comprises a recess on a periphery thereof.

6. The structure according to claim 1, wherein the input/output ports are located on a side of the input/output port bar.

7. An input/output port bar circuit connected between a computer and a computer peripheral, comprising:

a main circuit for converting a USB signal into an output signal acceptable by the computer peripheral or for connecting an input signal into the USB signal acceptable by the computer;

a connecting cable, with a plurality of connectors connected to the computer and the main circuit, for transmitting the USB signal from the computer to the main circuit, or for transmitting an input signal from the main circuit to the computer; and a power switch circuit, for controlling a power supply of the main circuit from the computer via the connecting cable or from an external power source.

8. The circuit according to claim 7, wherein the power switch circuit further comprises:
   a transistor having a source coupled to a power voltage of the connecting cable;
   a first resistor connected between a gate of the transistor and a ground;
   a diode having a cathode connected to a drain of the transistor and an anode connected to the external power source;
   a second resistor connected between the gate of the transistor and the anode of the diode.

9. The circuit according to claim 8, wherein the power switch circuit further comprises a third resistor, having one end connected to the anode of the diode and the other end connected to the main circuit.

10. The circuit according to claim 8, wherein the power switch circuit further comprises a capacitor, connected between the gate of the transistor and the ground.

11. The circuit according to claim 8, wherein the power switch circuit further comprises three capacitors connected to the drain of the transistor and the ground.

12. A computer system comprising:
   a central processing unit (CPU);
   a mother board for removably mounting the CPU;
   at least one memory for storing data and program;
   a display;
   an input device; and
   an input/output port bar structure, which comprises:
      a main circuit board;
      a connecting cable, having a first terminal and a second terminal coupled to the computer and the main circuit board;
      a first enclosure;
      a second enclosure, coupled to the first enclosure for containing the main circuit board and the connecting cable therein;
      a plurality of input/output ports, electrically connected to the main circuit board and connected to the computer peripheral;
      a laminate, positioned between the first and second enclosures for receiving the connecting cable;
      a loop, removably movable between the laminate and the first enclosure; and a sliding member, for the sliding member sliding along a strip gap between a storage position and a usage position.

* * * * *